No. 785,219.

Patented March 21, 1905.

UNITED STATES PATENT OFFICE.

KARL KIESER, OF ELBERFELD, GERMANY, ASSIGNOR TO FARBENFABRIKEN OF ELBERFELD CO., OF NEW YORK, N. Y., A CORPORATION OF NEW YORK.

COLOR-SENSITIVE PHOTOGRAPHIC EMULSION AND PROCESS OF MAKING SAME.

SPECIFICATION forming part of Letters Patent No. 785,219, dated March 21, 1905.

Application filed October 30, 1903. Serial No. 179,183.

*To all whom it may concern:*

Be it known that I, KARL KIESER, doctor of philosophy, chemist, residing at Elberfeld, Germany, (assignor to the FARBENFABRIKEN OF ELBERFELD CO., of New York,) have invented a new and useful Improvement in Color-Sensitive Photographic Emulsions and Processes of Making Same; and I do hereby declare the following to be an exact and clear description of my invention.

I have found a new and valuable process for preparing color-sensitive photographic emulsions, being of great technical value for the manufacture of plates, papers, films, or the like.

My new process consists in first treating silver salts sensitive to light with a suitable sensitizing-dyestuff or a mixture of such dyestuffs and then preparing the photographic emulsions with the aid of the so-dyed silver compounds. The emulsions thus prepared possess a high degree of sensitiveness.

On employing my process a suppression of the effect of one or of several dyestuffs by another dyestuff being present at the time is avoided. The number of sensitizing-dyestuffs which can be employed for my process is therefore much increased, and it is possible to attain complete isochromatisme. One can employ dyestuffs being only soluble in solvents which cannot be mixed with the emulsions or which cannot diffuse into the substratum. In my new process one can use higher concentrated solutions of sensitizing-dyestuffs than is possible in other processes, and one can so obtain a higher degree of sensitiveness.

In carrying out my new process practically I can proceed as follows: In order to prepare the gelatin emulsion, I proceed in the well-known manner by introducing an aqueous solution of silver nitrate (one molecule) into an aqueous solution of hydrobromic acid (one molecule) while stirring. The silver bromid thus precipitated in a pure and granulated state is then washed with water and shaken for five minutes with a solution of a sensitizing-dyestuff, (about one per ten thousand.) The colored silver salt thus obtained is washed until the wash-water is uncolored and introduced into a four-per-cent. solution of gelatin at 40° centigrade. It is stirred for several hours until the emulsion is homogeneous, and this emulsion is then employed for coating glass plates, papers, celluloid plates, and the like. It will also be possible to employ other sensitive silver salts and other emulsifying agents—for example, collodion. On using this substance it is necessary to precipitate the silver salts from alcoholic solutions.

The plates, papers, films, or the like are coated with the above emulsion in the usual manner.

Having now described my invention and in what manner the same is performed, what I claim as new, and desire to secure by Letters Patent, is—

1. In the art of producing color-sensitive photographic emulsions the process which consists in first treating silver compounds sensitive to light with suitable sensitizing-dyestuffs and then emulsifying the so-dyed products, substantially as described.

2. The herein-described color-sensitive photographic materials which, as the spectroscopic test shows, contain colored grains of silver salt, while the emulsifying agent itself remains uncolored, substantially as described.

In testimony whereof I have signed my name in the presence of two subscribing witnesses.

KARL KIESER.

Witnesses:
  OTTO KÖNIG,
  JOSEPH LANGE.